United States Patent Office 3,431,550
Patented Mar. 4, 1969

3,431,550
ULTRASONIC PRESENCE DETECTORS
Ian Leighton Spence, Sunnyhill, Derbyshire, England, assignor to The Marconi Company Limited, London, England, a British company
Filed Aug. 17, 1967, Ser. No. 661,330
Claims priority, application Great Britain, Aug. 23, 1966, 37,838/66
U.S. Cl. 340—1    2 Claims
Int. Cl. G01s 9/66

ABSTRACT OF THE DISCLOSURE

Ultrasonic presence detectors use the difference in transit time between a pulse transmitted to and reflected from a reference surface and a pulse similarly transmitted when a body is present to detect the body. The body produces a responded condition which is only changed on receipt of a reflected echo. In these arrangements the reflected pulses are branched into two paths in one of which is a normally open gate which is closed at times in which pulses reflected from the reference surface would be received and in the other is a normally closed gate which is open at those times. The invention uses a threshold responsive device in one path which passes only signals exceeding a certain minimum amplitude.

---

Figure 1:
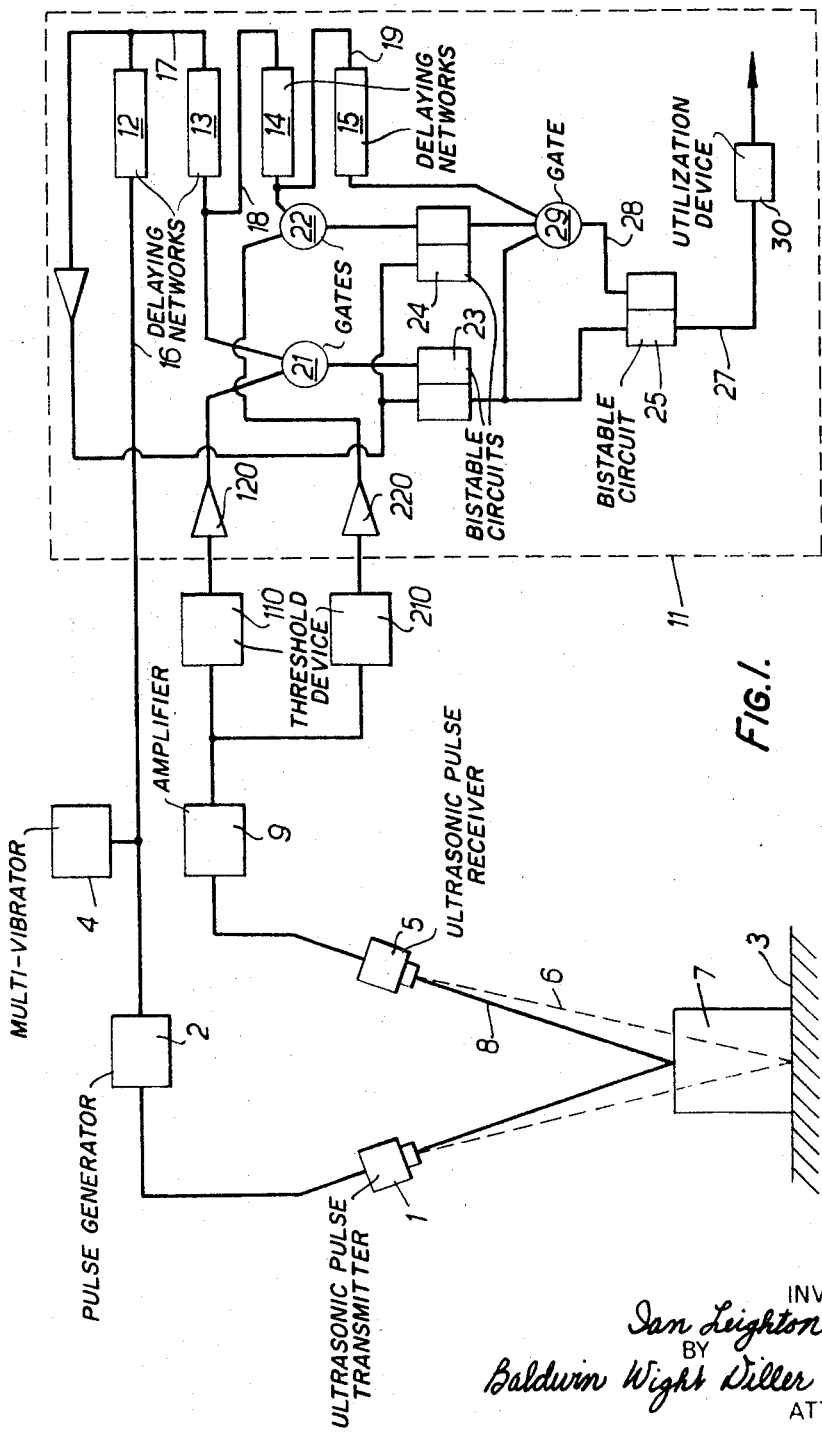

This invention relates to ultrasonic presence detectors, more particularly, though not exclusively to ultrasonic vehicle detectors for use in road traffic control.

The ultrasonic presence detector described herein and in co-pending U.S. application Ser. No. 647,828 relates to ultrasonic presence detectors of the kind which rely upon the difference between the transit time of an ultrasonic pulse transmitted by a transmitting transducer towards and reflected from a reference surface and the transit time of an ultrasonic pulse similarly transmitted if a body is present between the transducer and the reference surface to indicate the presence of the body. An ultrasonic presence detector of this kind comprises means for producing a predetermined responded condition when a body is interposed between the transmitting transducer and the reference surface and means actuated only upon receipt of a reflected echo from the reference surface for changing the responded condition.

In the presence detector disclosed herein, as in the presence detector of the aforementioned co-pending United States application Ser. No. 647,828 reflected pulses are branched into two paths, one of which includes a normally open gate which is closed at the times in which pulses reflected from the reference surface would be received, and the second of which includes a normally closed gate which is open at said times, and means actuated by pulses passed by said normally open gate are arranged to set up a responded condition indicative of the presence of an interposed body, said responded condition being terminated by pulses passed by said normally closed gate. In order to reduce the chances of faulty operation by spurious responses from cyclists, pedestrians and the like, a threshold responsive device, such as a Schmitt trigger circuit may be interposed in the receiver channel prior to the branching thereof into the two paths.

However, an arrangement including a threshold responsive device as above described can, in certain conditions, for example in the case of a vehicle detector when there is much snow on the ground, operate somewhat unsatisfactorily because, in such conditions, an echo reflected from the reference surface may be insufficiently strong to exceed the threshold level of the threshold responsive device and, if this happens, the said reflected echo will not terminate the responded condition. One object of the present invention is to overcome this defect.

According to the present invention an ultrasonic presence detector which is generally in accordance with the presence detector disclosed hereinabove (i.e., one in which received pulses are branched into two paths one of which contains a normally open gate which is closed at times in which pulses reflected from the reference surface would be received and the second of which includes a normally closed gate which is open at said times) comprises in the one path a threshold responsive device adapted to respond to or pass only signals exceeding a predetermined minimum amplitude. Preferably a second threshold responsive device is provided in the second path, this second device being adapted to respond to or pass only signals exceeding a second, substantially lower, predetermined minimum amplitude.

In practice it is convenient to be able to vary the pulse repetition period of transmitted ultrasonic pulses e.g. in the case of a vehicle detector in order to adjust operation to suit different installed heights of the transmitter and/or receiver above a road surface. In those embodiments of the presence detector wherein reflected pulses are fed to one or more threshold responsive devices (located prior to the aforementioned branching or in one or more of the branches) before ultilisation, alteration in the propagation distance a pulse has to travel from the transmitter to the reference surface and back to the receiver (e.g. alteration in installation height) will obviously alter the received pulse strength in otherwise unchanged conditions. A threshold responsive device adjusted to have a threshold response value which is right in the case of a certain propagation distance will therefore be wrong if the distance is altered. The object of another feature of this invention is to provide convenient adjustment means for dealing with this problem.

According to another feature of the present invention an ultrasonic presence detector which is in accordance with the invention contained in the aforesaid co-pending U.S. application and wherein reflected pulses are fed to one or more threshold devices before utilisation comprises means for adjusting the transmitted pulse repetition period and means for adjusting the effective threshold response value or values. Preferably these two adjustment means are gang-controlled though it is possible to use independent controls and to associate therewith scales whereby they may be correctly adjusted to suit one another. The effective threshold response value or values may be adjusted by adjusting the actual threshold value or values of the threshold responsive device or devices but it is usually simpler to accomplish this by adjusting the gain or gains of an amplifier or amplifiers through which said device or devices is or are fed.

Where the timing of the presence detector relies upon a multivibrator preferably a set of different multivibrator time constant determining components are provided selectable in turn by means of a uniselector switch. Preferably again adjustment of the gain of the amplifier is achieved by providing thereacross a feedback loop into which one or other of a set of limiting resistors may be switched by means of a uniselector switch. Preferably the uniselector switch controlling the time constant of the multivibrator and the uniselector switch controlling the gain of the amplifier are ganged together and controlled by the same control unit which may be situated at any point convenient to the operator.

Figure 2:
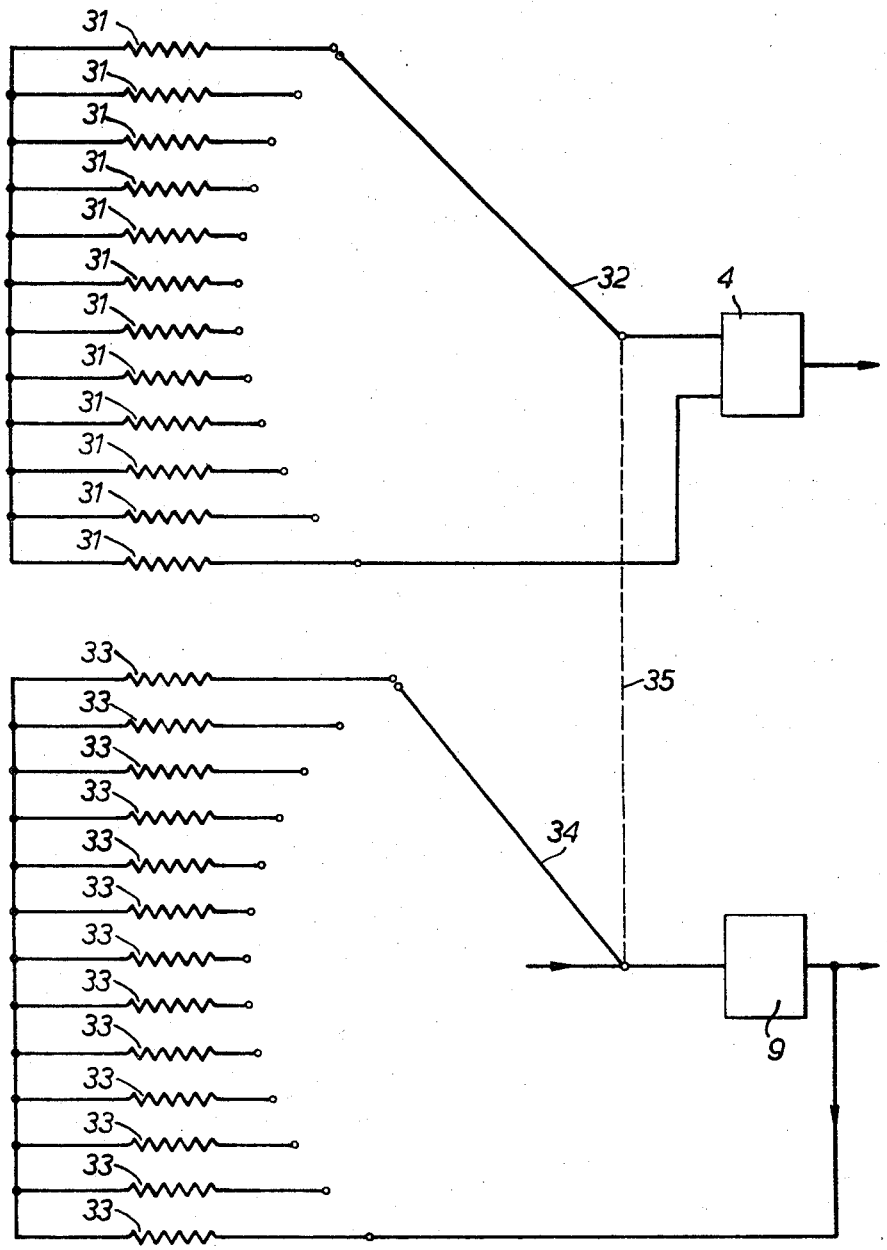

The invention is illustrated in and further described with reference to the accompanying drawings in which FIGURE 1 shows in block schematic form one embodiment of an ultrasonic traffic detector in accordance with the present invention, and FIGURE 2 illustrates a modification which may be made to the embodiment of the present invention shown in the accompanying FIGURE 1 and also to further ultrasonic presence detectors such as, for example, the one contained in our co-pending U.S. application Ser. No. 647,828.

Wherever possible like references have been used to denote like parts in the present drawings and the drawing accompanying the said co-pending specification.

Referring to FIGURE 1 the ultrasonic traffic detector illustrated thereby is generally similar to the detector described in co-pending U.S. application and to the foregoing description with reference to the drawing accompanying that specification except for the arrangement provided for applying signals from the amplifier 9 to the normally open gate 21 and the normally closed gate 22. In the embodiment shown in the present FIGURE 1 signals from amplifier 9 are branched directly into two paths. The first path, leading to normally open gate 21, contains a Schmitt trigger threshold circuit 110 and an amplifier 120 and the second path, leading to normally closed gate 22, contains a Schmitt trigger threshold circuit 210 and an amplifier 220. Threshold circuit 110, in the path leading to normally open gate 21, is adjustable to a level such as to prevent the passage of spurious reflected signals from cyclists, pedestrians and the like. Threshold circuit 210, in the path leading to the normally closed gate 22, is adjustable to such level as to pass pulses reflected from the road surface. Thus, threshold circuit 110 may be adjusted to prevent spurious reflected signals from being applied to the normally open gate 21 whilst threshold circuit 210 may be adjusted to pass reflected echoes from the road surface to the normally closed gate 22 even though the pulses reflected from the road surface may be of low amplitude due to attenuation caused by a layer of snow on the road surface, whilst still preventing the passage of lower level noise signals.

The modification illustrated in FIGURE 2 consists in providing the multivibrator 4 with a set of different multivibrator time constant determining resistors 31 each selectable in turn by means of a uniselector switch the rotor of which is shown at 32. Thus the frequency of operation of the multivibrator 4 may be adjusted in discrete steps in order to permit the traffic detector to be operated with different distances separating the transmitting and receiving transducers from the ground surface. Also a feedback loop is provided across the amplifier 9. A set of different limiting resistors 33 are provided to be switched in turn into the feedback loop across amplifier 9 by means of a further uniselector switch the rotor of which is shown at 34. Thus the overall gain of the amplifier 9 may be adjusted suitably to adjust the effective threshold response values of the threshold circuits 110 and 210 (or threshold value of the threshold circuit 10 of the embodiment described with reference to the drawing accompanying our co-pending specification) in order to compensate for changes in the amplitudes of received echo signals resulting from the detector being operated with different distances separting the transmitting and receiving transducers from the road surface. The rotors 32 and 34 are conveniently ganged to move together, as represented by the dashed line 35, and are controlled by the same control unit (not shown) which may be situated at any point convenient to the operator.

I claim:

1. An ultrasonic presence detector for detecting the presence of a body between the detector and a reference surface comprising a transmitting transducer; a receiving transducer; a multivibrator for determining the timing of the detector; means for adjusting the transmitted pulse repetition period including a set of differing multivibrator time constant determining components, and a first uniselector switch for selectively connecting said time constant determining components with said multivibrator to alter the timing thereof; means for producing a pre-determined responded condition when a body is interposed between the transmitting transducer and the reference surface; means actuated only upon receipt of a reflected echo by said receiving transducer for changing the responded condition; means for branching pulses from said receiving transducer corresponding to received pulses into two paths; a normally open gate included in one of said two paths which is closed at times in which pulses reflected from the reference surface would be received; a normally closed gate included in the second of said two paths which is open at said times; a threshold responsive device in one of said two paths responsive to and for passing only signals exceeding a pre-determined minimum amplitude; means for adjusting the effective threshold response value of said threshold responsive device; and amplifier means for feeding output signals therefrom to said threshold responsive device, said amplifier means having a feedback loop; said means for adjusting the effective threshold response value comprising a plurality of limiting resistors and a second uniselector switch electrically connected in said feedback loop for selectively placing said resistors in said feedback loop, said first uniselector switch and said second uniselector switch being ganged together for the common controlling thereof.

2. An ultrasonic presence detector for detecting the presence of a body between the detector and a reference surface comprising a transmitting transducer; a receiving transducer; means for producing a pre-determined responded condition when a body is interposed between the transmitting transducer and the reference surface; means actuated only upon receipt of a reflected echo by said receiving transducer for changing the responded condition; receiver channel means for branching pulses from said receiving transducer and corresponding to received reflected pulses into two paths; a normally open gate included in one of said two paths which is closed at the times in which pulses reflected from the reference surface would be received; a normally closed gate included in the second of said two paths which is open at said times; means actuated by pulses passed by the normally open gate to set up a responded condition indicative of the presence of an interposed body; means actuated by pulses passed by said normally closed gate for terminating the responded condition; a threshold responsive device in said receiver channel means responsive to and for passing signals exceeding a pre-determined minimum amplitude; amplifier means in said receiver channel means for feeding output signals therefrom to said threshold responsive device, said amplifier means having a feedback loop; a multivibrator for determining the timing of the detector; means for adjusting the transmitted pulse repetition period of said transmitting transducer including a set of different multivibrator time constant determining components and a first uniselector switch for selectively connecting said time constant determining components with said multivibrator to alter the timing thereof; and means for adjusting the effective threshold response value of said threshold responsive device including a plurality of limiting resistors and a second uniselector switch electrically connected in said feedback loop of said amplifier means for selectively placing said resistors in said feedback loop.

References Cited

UNITED STATES PATENTS

| | | | |
|---|---|---|---|
| 3,030,608 | 4/1962 | Polster | 340—1 X |
| 3,110,008 | 11/1963 | Kendall et al. | 340—1 X |
| 3,199,074 | 8/1965 | Hales et al. | 340—1 X |
| 3,255,434 | 6/1966 | Schwarz | 340—38 |
| 3,329,932 | 7/1967 | Aver | 340—38 |

RICHARD A. FARLEY, *Primary Examiner.*

U.S. Cl. X.R.

340—38